(12) United States Patent
Tarasenko et al.

(10) Patent No.: US 6,376,972 B1
(45) Date of Patent: Apr. 23, 2002

(54) POWERFUL GLOW DISCHARGE EXCILAMP

(75) Inventors: Victor F. Tarasenko; Aleksey N. Panchenko; Victor S. Skakun; Edward A. Sosnin, all of Tomsk (RU); Francis T. Wang, Danville, CA (US); Booth R. Myers, Livermore, CA (US); Martyn G. Adamson, Danville, CA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/442,995

(22) Filed: Nov. 18, 1999

Related U.S. Application Data

(60) Provisional application No. 60/109,053, filed on Nov. 19, 1998.

(51) Int. Cl.[7] .................................................. H01J 17/26
(52) U.S. Cl. ..................... 313/231.01; 313/619
(58) Field of Search ........................... 313/231.01, 493, 313/609, 610, 611, 619, 634, 231.31, 231.41

(56) References Cited

U.S. PATENT DOCUMENTS

| | | | |
|---|---|---|---|
| 3,721,851 A | 3/1973 | Ceccon et al. | 313/201 |
| 4,250,427 A | 2/1981 | Neister | 313/217 |
| 5,777,437 A | 7/1998 | Neister | 313/635 |

FOREIGN PATENT DOCUMENTS

| | | |
|---|---|---|
| RU | 1792196 | 8/1995 |
| RU | 2067337 | 9/1996 |
| RU | 2089962 C1 | 9/1997 |
| RU | 2089971 C1 | 9/1997 |

OTHER PUBLICATIONS

A.M. Boichenko, V.F. Tarasenko, E.A. Fomin, and S.I. Yakovlenko, "Broadband emission continua in rare gases and in mixtures of rare gases with halides", Quantum Electronics, 1993, vol. 23, N 1, pp. 3–25.

A.A. Kuznetsov, V.S. Skakun, V.F. Tarasenko, and E.A. Fomin, "Excimer electric–discharge tube with 1~126, 146, or 172 nm", Tech. Phys. Lett., 1993, vol. 19, ? 3, pp. 133–134.

V.A. Vizir', V.S. Skakun, G.V. Smorudov, E.A. Sosnin, V.F. Tarasenko, E.A. Fomin, V.V. Chervyakov, "Coaxial excimer lamps pumped by barrier and longitudinal discharges", Quantum Electronics, 1995, vol. 25, No. 5, pp. 494–497.

A.N. Panchenko, V.S. Skakun, E.A. Sosnin, V.F. Tarasenko, M.I. Lomaev, "High–power coaxial excilamps with an average power of over 100 watts", Tech. Phys. Lett., 1995, vol. 21, ?10, pp. 851–852.

(List continued on next page.)

Primary Examiner—Vip Patel
(74) Attorney, Agent, or Firm—Randall W. Chang; William C. Daubenspeck; Virginia B. Caress

(57) ABSTRACT

A powerful glow discharge lamp comprising two coaxial tubes, the outer tube being optically transparent, with a cathode and anode placed at opposite ends of the tubes, the space between the tubes being filled with working gas. The electrodes are made as cylindrical tumblers placed in line to one other in such a way that one end of the cathode is inserted into the inner tube, one end of the anode coaxially covers the end of the outer tube, the inner tube penetrating and extending through the anode. The increased electrodes' surface area increases glow discharge electron current and, correspondingly, average radiation power of discharge plasma. The inner tube contains at least one cooling liquid tube placed along the axis of the inner tube along the entire lamp length to provide cathode cooling. The anode has a circumferential heat extracting radiator which removes heat from the anode. The invention is related to lighting engineering and can be applied for realization of photostimulated processes under the action of powerful radiation in required spectral range.

14 Claims, 3 Drawing Sheets

OTHER PUBLICATIONS

A.M. Boichenko, V.F. Tarasenko, S.I. Yakovlenko, "The Influence of the Pressure and the Composition of the Mixture on the Characteristics of an ArF Exciplex Lamp", Laser Physics, 1995, vol. 5, No. 4, pp. 727–730.

A.M. Boichenko, A.N. Panchenko, V.F. Tarasenko. and S.I. Yakovlenko, "Efficient Emission of Xe–Cl2(HCl) and Kr–Cl2(HCl) Mixtures Pumped by a Glow Discharge", Laser Physics, 1995, vol. 5, No. 6, pp. 1112–1115.

A.M. Boichenko, V.S. Skakun, E.A. Sosnin, V.F. Tarasenko, S.I. Yakovlenko, "Characteristics of an exciplex KrCl lamp pumped by a volume discharge", Quantum Electronics, 1996, vol. 26, No. 4, pp. 336–340.

A.M. Boichenko, A.N. Panchenko, V.F. Tarasenko, S.I. Yakovlenko, "Efficient emission from a He–Xe–NF3 mixture pumped by a glow discharge", Quantum Electronics, 1996, vol. 26, No. 5, pp. 407–409.

M.I. Lomaev, A.N. Panchenko, V.S. Skakun, E.A. Sosnin, V.F. Tarasenko, M.G. Adamson, B.R. Myers, and F.T. Wang, "Excilamp producing up to 130 W of output power and possibility of its applications", Laser and Particle Beams, 1997, vol. 15, N 2, pp. 339–345.

E.A.Sosnin, and V.F. Tarasenko, "A planar XeCl–exilamp pumped by a low–pressure glow discharge", Tech.Phys., 1997, vol. 42, ?12, pp. 1411–1413.

M.I. Lomaev, V.S. Skakun, E.A. Sosnin and V.F. Tarasenko, "Barrier discharge pumped excilamps", Atmos. Oceanic Optics, 1998, vol. 11, N 2–3. pp. 243–249.

M.I. Lomaev, A.N. Panchenko, E.A. Sosnin, and V.F. Tarasenko, "Cylindrical glow–discharge—pumped excimer lamps", Technical Physik, 1998, vol. 43,.?2. pp. 192–196.

A.N. Panchenko, V.F. Tarasenko, "Radiation Characteristics of Subnormal Glow Discharge in Mixtures of Inert Gases and Halogens", Optics and Spectroscopy, 1998, vol. 84, N 3, pp. 337–339.

A.N. Panchenko, E.A. Sosnin, V.F. Tarasenko, "Improvement of output parameters of glow discharge UV excilamps", Optics Communications, 1999, vol. 161, pp. 249–252.

V.F. Tarasenko, E.B. Chernov, M.V. Erofeev, A.N. Panchenko, V.S. Skakun, E.A. Sosnin, "Reliability and Lifetime of Glow, Barrier and Capacitive Discharge UV Excilamps", Proc. SPIE, 1999, vol. 3618, pp. 425–432.

M.I. Lomaerz A.N. Panchenko, V.S. Skakun, E.A. Sosnin, V.F. Tarasenko, M.G. Adamson, B.R. Myers, and F.T. Wang, "Excilamp Production up to 130 W of Output Power and Possibilities for its Applications", submitted to Applied Physics Letters, Jan. 1996.

Powerful Glow Discharge Excilamp, Patent RU No. 2096863 C1 (Russian Federation). Claimed by HCEI, Oct., 16, 1995, inventors: A.N. Panchenko, E.A. Sosnin and V.F. Tarasenko, Filed, Nov. 20, 1997, publication in Bulletin No 32.

US 6,376,972 B1

POWERFUL GLOW DISCHARGE EXCILAMP

CROSS-REFERENCE TO RELATED APPLICATIONS

This application claims the benefit of U.S. Provisional Application No. 60/109,053, filed Nov. 19, 1998, entitled "Powerful Glow Discharge Excilamp", which is incorporated herein by this reference.

STATEMENT OF GOVERNMENT INTEREST

The United States Government has rights in this invention pursuant to Contract No. W-7405-ENG-48 between the U.S. Department of Energy and the University of California.

BACKGROUND OF THE INVENTION

The present invention relates generally to excimer lamps ("excilamp"), and particularly to high power, high efficiency excimer lamps.

DESCRIPTION OF RELATED ART

Pulsed flashlamps providing intense emission of discharge plasma are discussed by Yu. G. Basov in *Pumping sources for microsecond lasers*, 1990, p.88–118. These flashlamps comprise a transparent outer casing, electrodes and power supply. Switching elements used in the power supply limit specific electric power deposited into gas discharge and pulse repetition rate. Hence the flash-lamp average radiation power is limited. Besides, the electrode material and outer casing are damaged at high input power resulting in high probability of flashlamp damage due to strong mechanical stress appearing during pumping pulse.

A cylindrical source of CW ultraviolet radiation is discussed by A. P. Golovitsky, and S. N. Kan in *Optika i Spektroskopoya*, 1993, vol.75, No.3, p.603–607. The source comprises pipe-shaped electrodes attached to the ends of transparent dielectric tube filled with gas, cooling system and power supply. Disadvantages of this source are nonuniformity of the radiation intensity along its length and complex cooling system such that only the cathode is water cooled while the tube itself remains uncooled.

U.S. Pat. No. 3,721,851 (Coaxial Flash-Lamp, class H 01 J 61/30, issued Mar. 20, 1973) discloses a coaxial flash-lamp which comprises two coaxial dielectric tubes forming circular discharge cavity and two coaxial conductors, one of which is placed on the inner surface of the inner tube. Circular electrodes connected with inner and outer conductors are placed in the coaxial cavity.

Possibilities for the application of high-efficiency, high-output excilamps operating at wavelengths below 250 nm range from waste treatment to materials processing. In waste treatment, conventional ultraviolet oxidation technology is used. UV light at wavelengths below 250 nm generates oxidizing species in aqueous effluent that contain traces of organic contaminants. An oxidant such as hydrogen peroxide usually is added to the wastewater, where it is dissociated by UV photons to produce strongly oxidizing OH radicals that are capable of completely oxidizing many organic compounds in a stepwise fashion (in complete mineralization, all carbon atoms are oxidized to $CO_2$, hydrogen atoms are oxidized to $H_2O$, and other nonmetallic elements to corresponding anions). Unfortunately, conventional UV sources, such as mercury or xenon lamps, do not emit efficiently or continuously at wavelengths below 240 nm, so there are opportunities to improve the destruction efficiency of this process with the application of one or more excilamp sources. The high-intensity light from excilamps also is expected to directly excite organic compounds, thus increasing their reactivity and hence their susceptibility to oxidation This also will be valuable as a means of completely destroying the most refractory organic contaminants, and even increasing maximum concentrations of organic contaminants treatable by the UV oxidation process. Complete mineralization of toxic organic compounds is a key objective in the treatment of contaminated wastewater.

In view of all of the above, there is a need for a high intensity, high efficiency excilamp source of UV light.

SUMMARY OF THE INVENTION

An object of the claimed invention is to improve average optical radiation power of glow discharge lamps which is achieved by the following way. According to the invention, a powerful glow discharge lamp comprises two coaxial tubes (inner and outer), the outer tube being optically transparent, with electrodes (cathode and anode) attached at the tubes' ends; working gas fills the cavity between the inner and outer tubes; the electrodes are made as coaxial cylindrical tumblers placed, respectively, on the ends of the inner and outer tubes in such a way that one end of the cathode is inserted into the inner tube, while the anode coaxially covers the outer tube and the inner tube is extended through the anode. The glow discharge lamp further comprises a cooling liquid tube coaxially located within the inner tube. Cooling fluid flows within the cooling liquid tube, and exits through holes in the side surface of the cooling liquid tube into the cavity cathode. The cooling fluid removes heat from the cathode and flows through the inner tube from which it subsequently exits. The cooling fluid also removes heat from the inner tube surface as it flows along the inner tube. The glow discharge lamp further comprises a circumferential heat extracting radiator in physical contact with the anode from which it removes heat.

BRIEF DESCRIPTION OF THE DRAWINGS

These and other features, aspects, and advantages of the present invention will become better understood with regard to the following description appended claims, and accompanying drawings where:

DETAILED DESCRIPTION OF THE INVENTION

| Abbreviations | |
|---|---|
| A | ampere |
| cm | centimeter |
| CW | continuous wave |
| DC | direct current |
| kV | kilo volt |
| kW | kilo watt |
| mA | milliampere |
| mm | millimeter |
| nm | nanometer |
| ppm | parts per million |
| UV | ultraviolet |
| W | watt |

Figure 1:
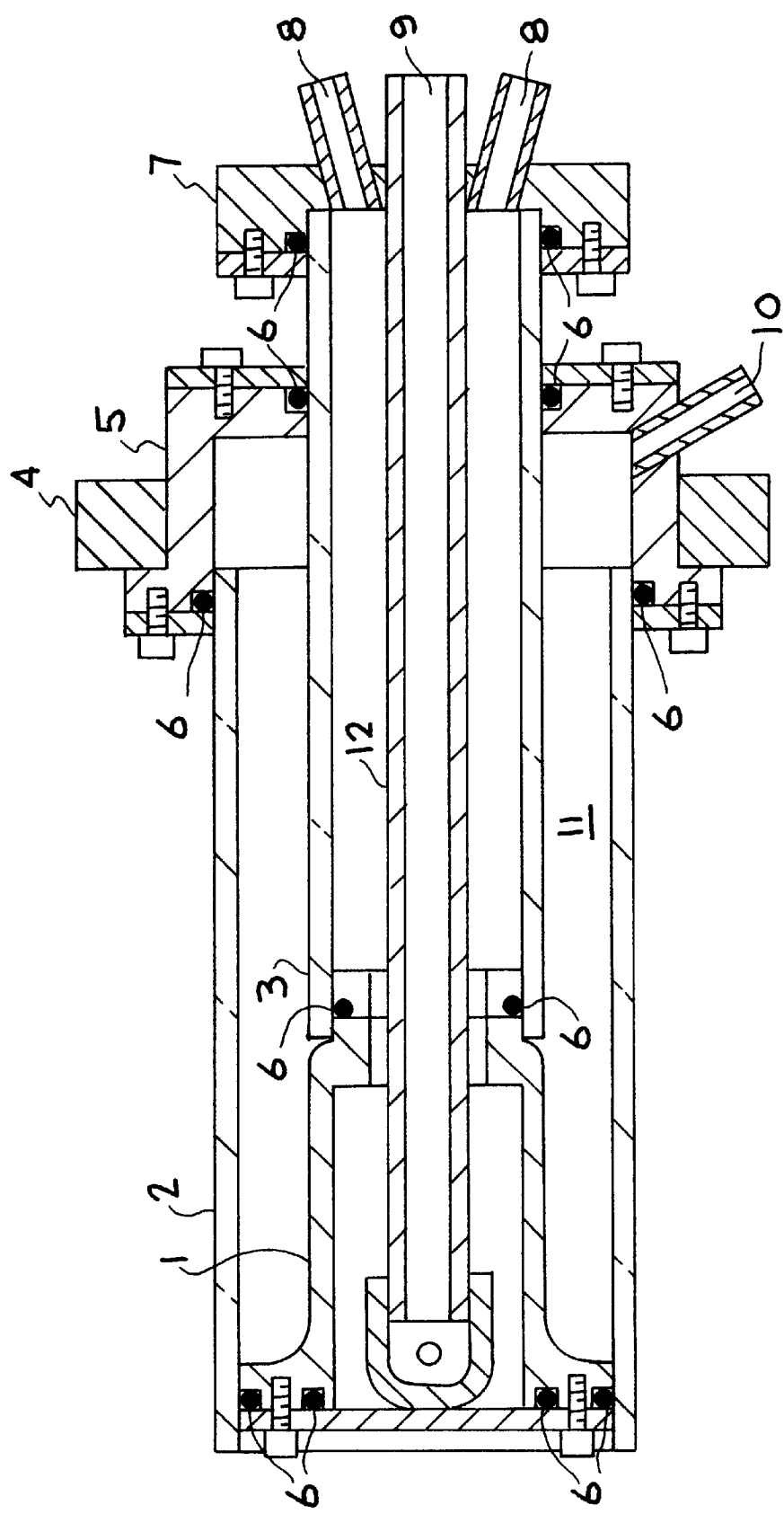
FIG. 1 illustrates an embodiment of the present invention comprising: (1) cathode; outer (2) and inner (3) coaxial cylindrical tubes; (4) heat extracting radiator; (5) anode; (6) gaskets; (7) flange; (8) water output port; (9) water input port; (10) union for bleeding in working gas; (11) cavity between inner and outer tubes for working gas; (12) cooling liquid tube.

A first embodiment according to the present invention is described hereunder with reference to FIG. 1.

Referring to FIG. 1, we have two coaxial cylindrical tubes, denoted outer (2) and inner (3). The outer tube (2) is made of optically transparent material, preferably quartz. The inner tube (3) is made of non electrically conductive material. Cathode (1) and anode (5) are coaxial metal electrodes, shaped as coaxial cylindrical tumblers located at the ends of the inner (3) and outer (2) tubes. The cathode (1), anode (5), outer tube (2) and inner tube (3) define a working gas cavity (11). The working gas cavity (11) is filled with working gas capable of being ionized by discharge. The electrodes (1) and (5) are preferably of nickel or stainless steel. If the working gas contains fluorine or chlorine, the electrodes (1) and (5) need to be nickel. The anode (5) coaxially covers one end of the outer tube (2). The inner tube (3) penetrates and extends through the anode (5). The cathode (1) is located within the outer tube (3) at the end distal from the anode (5). One end of the cathode (1) extends into the inner tube (3), providing fluid communication between the interior cavity of the cathode (1) and the interior of the inner tube (3). The cathode (1) and the anode (5) are coupled to a power supply. Elastomer gaskets (6), preferably rubber, are disposed between regions where the cathode (1) and the anode (5) are coupled to the outer tube (2) and the inner tube (3), providing hermetic seals. A union (10) provides a means for bleeding in the working gas into the working gas cavity (11).

In a further embodiment, the inner tube (3) is made of optically reflective material which enhances the amount of emitted radiation through the outer tube (2). In a further embodiment, again referring to FIG. 1, the glow discharge lamp further comprises at least one cooling liquid tube (12), preferably metal, coaxially located within the inner tube (3). Cooling fluid, such as water and air, preferably water, enters one end (9) of the cooling liquid tube (12). The other end of the cooling liquid tube (12) has a plurality of holes along its side surface, this cooling liquid tube end extends into the interior cavity of the cathode (1). Cooling fluid from the cooling liquid tube (12) enters the interior cavity of the cathode (1) through the cooling liquid tube holes, removes heat from the cathode (1), passes into and through the inner tube (3) from which it finally exits via a removal port (8). The cooling fluid also removes heat from the surface of the inner tube (3) as it flows. A flange (7) provides a fluid seal connection for the inner tube (3) and the cooling liquid tube (12).

In a further embodiment, the inner tube (3) is made of optically transparent material, the outer tube (2) is made of optically reflective material, and fluid to be treated is flowed through inner tube (3) as cooling fluid. Such fluids may include wastewater to be treated, and water or air to be disinfected. In a still further embodiment the cooling liquid tube (12) is also made of an optically transparent material. In a further embodiment, the outer tube (2) is made of optically transparent material, but has an optically reflective material disposed on its outer periphery. Having the outer tube (2) either be made of optically reflective material or an optically reflective material disposed on the outer tube (2) periphery causes the outer tube (2) to reflect emitted UV back into the fluid, and the fluid absorbs UV as it flows through cooling liquid tube (12) and as it flows back through inner tube (3).

In a further embodiment, again referring to FIG. 1, the glow discharge lamp further comprises a metal heat extracting radiator (4) in contact with and circumferentially surrounding the anode (5), wherein the heat extracting radiator (4) conducts heat from the anode (5) and releases it to the surrounding ambient atmosphere.

The aim of the claimed invention is to improve average optical radiation power of glow discharge lamps, which is achieved by the following way. The present invention provides improved heat removal from the cathode at high pulse repetition rate or under continuous wave (CW) excitation allowing higher pumping power and radiation. The tumbler shape of the electrodes provide increased electrode surface area which increases glow discharge current and, correspondingly, average radiation power of discharge plasma. In order to get maximal power of radiation, it is necessary to have optimal space between the inner and outer tubes, and the discharge should occupy the major part of the space between the inner and outer tubes under optimal densities of current in that area. The square area of the cathode interior cavity must be significantly more than the square area of the cross sectional area between the inner and outer tubes, preferably at least a ratio of 3:1. The tumbler shape of the cathode provides such a structure. Power comparing of KrCl* molecules radiation in the known construction with the suggested one gives the extension of the average radiation power three times at the expense of the suggested construction of electrodes.

The lamp claimed operates in the following manner. Direct or pulsed voltage is applied to the lamp electrodes and glow discharge in the working gas cavity between the outer tube (2) and the inner tube (3) is initiated. Radiation spectra of the discharge plasma depends on the composition and pressure of the working gas mixture. The working gas comprises a mixture of inert gases and halogens. Preferred mixtures are: Kr—$Cl_2$ or He(Ne)—Kr—$Cl_2$ for L~222 nm; Xe—$Cl_2$ or He(Ne)—Xe—$Cl_2$ for L~308 nm; Xe—$Br_2$ or He(Ne)—Xe—$Br_2$ for L~282 nm; Kr—$Br_2$ or He(Ne)—Kr—$Br_2$ for L~206 nm. The tumbler shapes of the cathode (1) and anode (5) provide increased surface areas which improve input power and average radiation power. The cathode (1) and anode (4) design provides intensive heat removal due to direct fluid cooling of the cathode (1). The cooling liquid tube (12) inserted into the inner tube (2), with cooling liquid input (9) and removal (8) ports on the same end of the cooling liquid tube allows one to modulate the cooling system parameters on one side of the lamp so that the lamp can be placed inside a small cavity which is necessary for some applications. The cooling liquid tube (12) provides an effective means to remove heat from the cathode (1) and the inner tube (3). A circumferential heat extracting radiator (4) effectively removes heat from anode (5).

EXAMPLE 1

Experimental investigation of the glow discharge lamp demonstrates that the claimed design improves output radiation power.

Experimental Apparatus Coaxial quartz tubes of 40 cm. in length were used. The outer tube internal diameter was 60 mm and the gap between the tubes ranged from 2.5 to 8.5 mm. The grounded cathode and anode were mounted on the ends of the tubes. Water was circulated as the cooling fluid. The anode was air-cooled. The excilamp received power from a DC power supply providing a glow discharge current up to 0.5 A. Gas mixtures Xe(Kr)—HCl(Cl$_2$) under pressure up to 30 Torr were studied. Discharge current I and voltage across the excilamp U were measured in our experiments. Input power was calculated as P=IU since the measurement errors due to the inductance of the discharge circuit are insufficient in the case of DC. Average UV output power was monitored by a calorimeter IMO-2N or a photocathode FEC-22 SPU. The powermeters were calibrated just before the measurements using an exciplex KrCl laser with specified output and provided instrumental error no more than 15%. The photocathode had peak sensitivity at wavelengths near 300 nm and was insensitive to radiation at wavelengths over 600 nm. In the case of the calorimeter, infrared radiation from the hot external surface of the excilamp was taken up using an infrared-absorbing light filter. In addition, calibrated light filters transparent only for UV placed in front of the powermeters were used to separate UV radiation in the excilamp output. The following procedure of measurements of UV output was used. An aperture of 1 cm$^2$ in area was placed directly against the excilamp surface. The powermeter was located at a distance L=20 cm from the aperture. Next, the aperture was considered to be a point source, emitting uniformly in a solid angle of 4π. In this case, the part of the radiation power that enters into the powermeter can be calculated according to the following expression: k=sin$^{-2}$α/2. Here, α=arctg (A/2L), where A is the input aperture of the powermeter. Next, the total radiation power was calculated taking into account the area of the radiating surface as well as the angular and axial distributions of the output. No less than ten tests were made during every measurement to avoid random errors. The validity of the procedure was tested in an industrial mercury lamp DRL-400 with specified UV output. Results of the measurements agreed with the specified UV output of the mercury lamp with an accuracy of 15%. Spontaneous radiation spectra in the range from 190 to 600 nm were recorded by a monochromator MDR-23 equipped with a photomultiplier FEU-100 and a register.

Results

Glow Discharge Stages

Three stages of glow discharge were discovered in our experiments. A discharge current no more than 2–3 mA and voltage across the excilamp of 5–7 kV are the characteristic properties of a high-voltage stage. A homogeneous luminescence of the whole discharge volume was observed in this case.

When the current was increased further, the discharge was changed in step into a stage of normal glow discharge. As this took place, voltage across the excilamp dropped to 2–3 kV, whereas the discharge current could increase up to 0.5 A. This process was reversible. As the discharge current was decreased to the level below 50 mA, the stage of glow discharge changed into the first one. Discharge in this stage generally took only a part of the excilamp volume. Its width was varied directly with current and inversely with gas pressure.

A constriction stage usually started after the excilamp operation over a long period under input power over 0.5 kW. In this stage, the discharge collapses to a narrow bright luminous filament, rapidly changing its place. Constriction generally occurred because of the tube overheating or exhaustion of chlorine-containing molecules in the gas mixture. In addition, output power in the UV region in this stage substantially falls off. Excilamp cooling and/or gas replacement are necessary to return to the glow discharge stage. In the present invention, there is sufficient cooling to preclude onset of the constriction stage.

Excilamp Pumped by High-voltage Discharge

Figure 2:
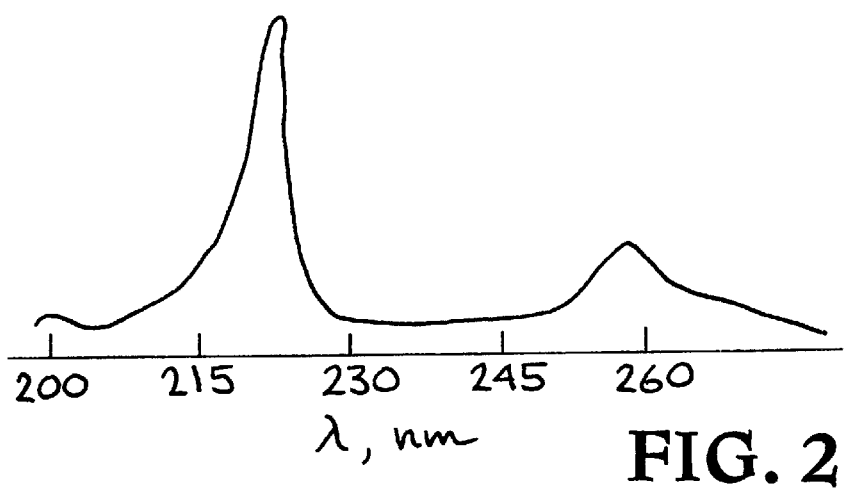
FIG. 2 illustrates the radiation spectrum of high-voltage discharge in $Kr:Cl_2=10:1$ mixture, gas pressure is 6 Torr.

As was pointed out above, a high-voltage discharge was monitored in the current range from 0.1 to 3 mA and voltage cross the lamp of 5–7 kV, with ballast resistance of 1000 kOhm. High voltage discharge was triggered at the voltage which exceeded the operating voltage for 10% and more. Triggering voltage of the high voltage discharge was 7–10 kV (110–200% from operating voltage). Voltages for triggering glow discharge are about 200–300% from operating voltage of glow discharge, with 100% triggering of normal glow discharge being achieved if triggering voltage is 300% of the operating one. In this operating regime, B—X (λ~222 nm) and D—X (λ~198 nm) bands of KrCl* molecules and a $^3\Pi_{2g}$–$^3\Pi_{2u}$ band of chlorine molecules (maximum at λ~258 nm) were the most intensive in output UV spectrum (see FIG. 2). The intensity of the optical lines in the wavelength region from 280 to 600 nm was found to be significantly lower than that of the UV bands. IR radiation of the excilamp with high-voltage discharge was low since the input power did not exceed 20 W and the surface of the excilamp was cold. Up to 80% of the output is emitted in the UV region. In addition, the intensity of UV radiation along the length of the excilamp did not change. Output power in the wavelength region below 250 nm was practically independent of the type of halide donor. An average power of 2.5 W and an efficiency of about 15% in Kr:Cl$_2$(HCl)=10:1 mixture under a pressure of 3–6 Torr were demonstrated. In this regime, output power does not change over a long operating period.

Excilamp Pumped by Blow Discharge

Figure 3:
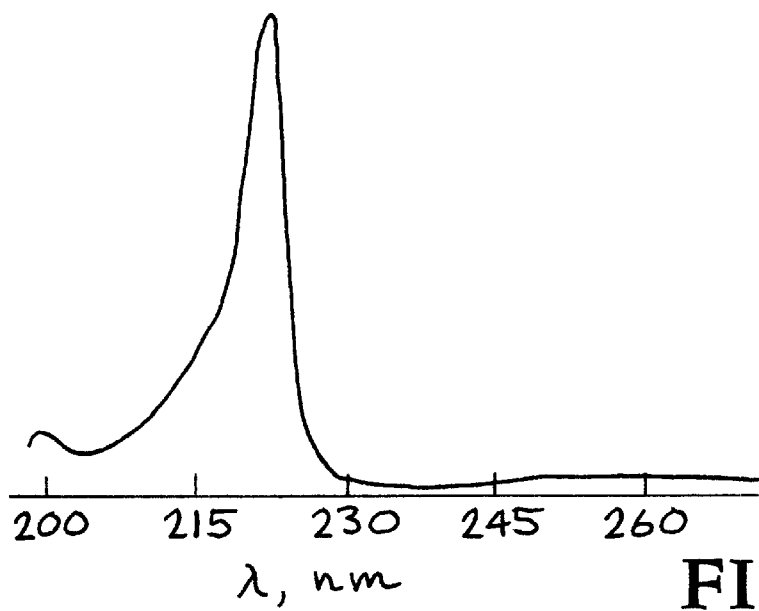
FIG. 3 illustrates the radiation spectrum of glow discharge in $Kr:Cl_2=10:1$ mixture, gas pressure is 6 Torr.
Figure 4:
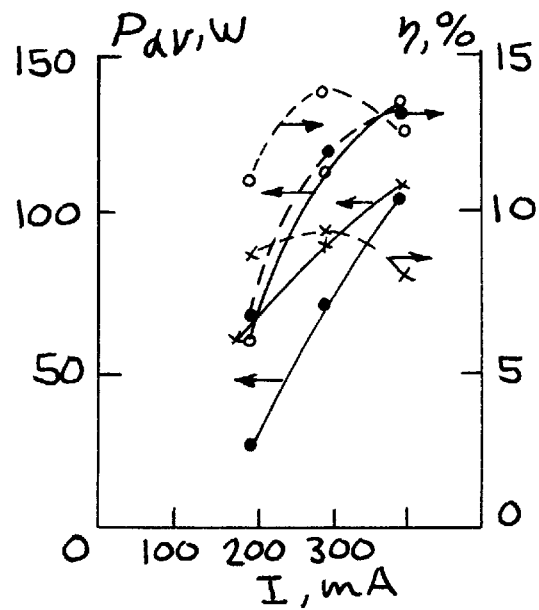
FIG. 4 illustrates output power at wavelengths below 250 nm (solid curves) and efficiency (dashed curves) versus discharge current in gas mixtures $Kr:Cl_2=10:1$. The gap is 8 mm. Curve with ● corresponds to gas pressure of P=3 Torr, curve with * corresponds to P=6 Torr, and curve with ○ corresponds to P=9 torr.

A spectrogram of the glow discharge UV radiation is presented in FIG. 3. Molecule bands of KrCl* and Cl$_2$* identical with those in high-voltage discharge were observed, but Cl$_2$* emission was sufficiently lower. As in the case of high-voltage discharge, radiating power at wavelengths over 280 nm was low. An excilamp with a gap of 8 mm was found to emit the highest average power. FIG. 4 depicts output power and efficiency versus discharge current. Output power at wavelengths below 250 nm over 100 W was obtained. Efficiency with respect to input power as much as 14% was demonstrated. The output in the Kr—HCl mixture was several times lower than that in the Kr—Cl$_2$ mixture. Similar results were obtained in the Xe:Cl$_2$ gas mixture at wavelengths below 308 nm.

Figure 5:
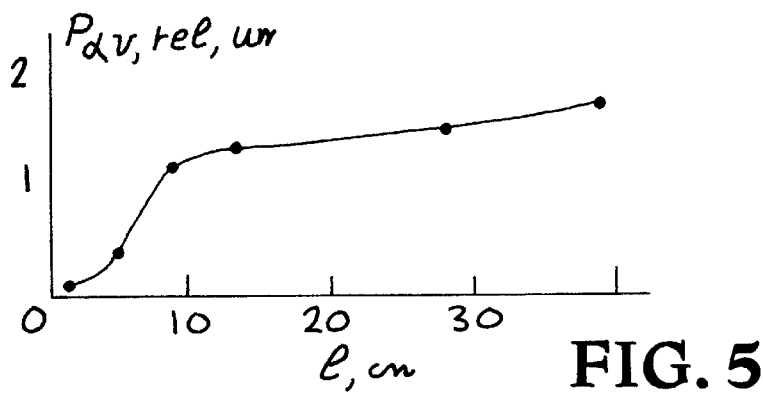
FIG. 5 illustrates distribution of output power at wavelengths below 250 nm along the length of the excilamp pumped by glow discharge. Maximum output is observed near the anode.

FIG. 5 depicts the output distribution along the length of the excilamp. One can see that the intensity of the UV radiation decreases noticeably only in the cathode region.

Figure 6:
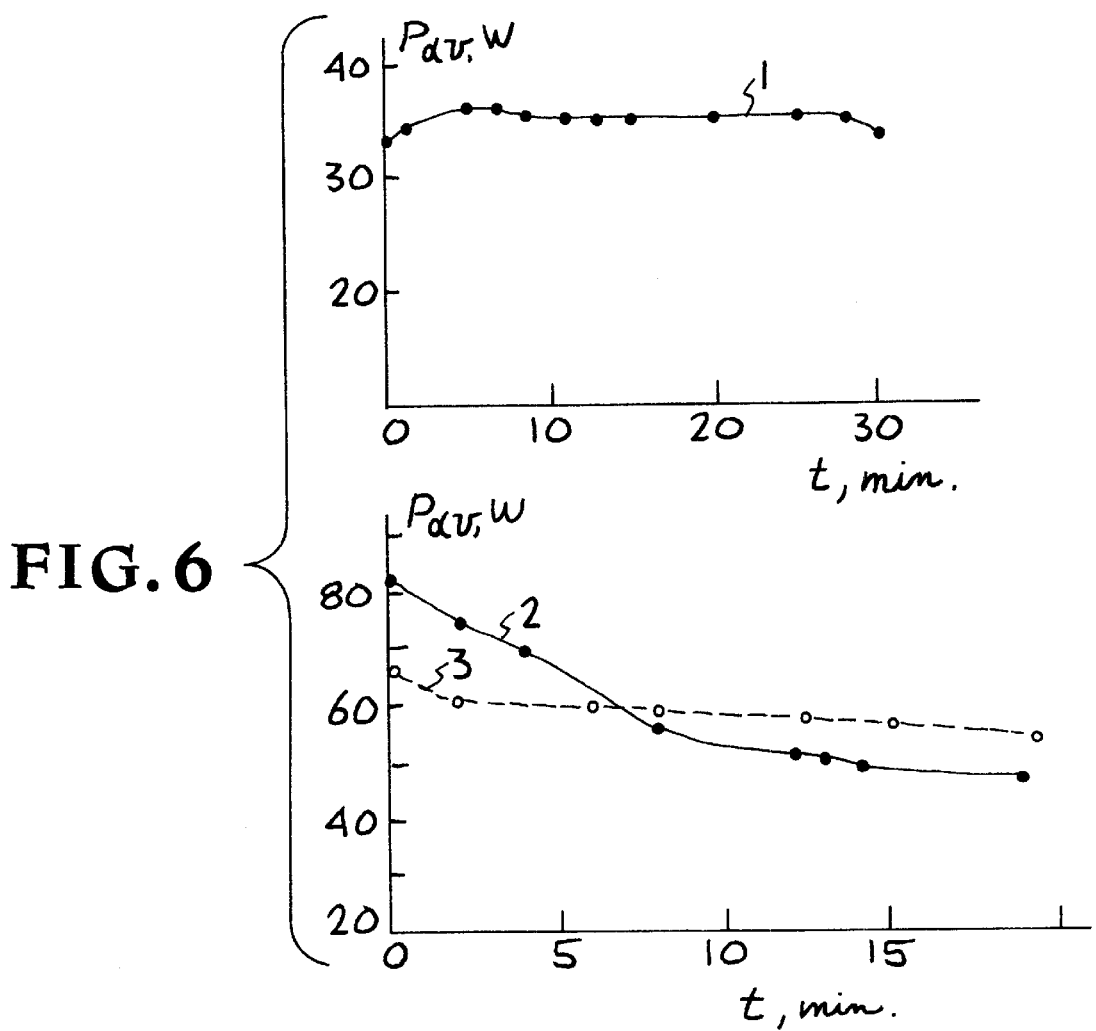
FIG. 6 illustrates output power versus operating time in gas mixture $Kr:Cl_2=3:1$ (curves 1,2) and $Kr:Cl_2=1:1$ (curve 3). Gas pressure is P=3 Torr. (a) Gap is 2.5 mm and the discharge current is 80 mA; (b) gap is 8 mm and the discharge current is 200 mA.

The output power of KrCl* excilamps with different gaps and discharge currents of 80 mA (a) and 200 mA(b) versus operating time is shown in FIG. 6. Output of some tens of watts remains unchanged during several tens of minutes, whereupon discharge constriction is observed. Note that the operating time of the excilamp is limited by overheating and exhaustion of the halogen donor. It is significant that the enlargement of excilamp dimensions can substantially increase the operating time. In particular, enlargement of the excilamp buffer volume (region not excited by discharge) increases the operating mixture life. In addition, upgrading of the excilamp design, cleaning of the original gas components, and improvement in fluid cooling show promise of substantial increase of mixture lifetime. Therefore, the development of long-operated sealed-off excilamps is possible.

In summary, output power at wavelengths below 250 nm and up to 130 W, and efficiency with respect to input power of 14% were obtained.

The invention is related to lighting engineering and can be applied for realization of photostimulated processes under the action of powerful radiation in required spectral range.

Obviously numerous modifications and variations of the present invention are possible in the light of the above teachings. It is therefore to be understood that within the scope of the appended claims the invention may be practiced otherwise than as specifically described therein.

What is claimed is:

1. A glow discharge lamp comprising:
   coaxial inner and outer tubes;
   an anode electrode substantially in the shape of a cylindrical tumbler having an interior cavity, the anode coaxially covering one end of the outer tube, the inner tube penetrating and extending through the anode;
   a cathode electrode substantially in the shape of a cylindrical tumbler having an interior cavity, the cathode being located within the outer tube at the outer tube end distal from the anode, the cathode further having an end which is inserted into the inner tube, with the inner and outer tubes, the cathode and the anode defining a working gas cavity;
   means for connecting the inner and outer tubes, the cathode and the anode so that the working gas cavity is a hermetically sealed cavity;
   and working gas, capable of being ionized, substantially filling the working gas cavity.

2. The glow discharge lamp as claimed in claim 1 further comprising:
   at least one cooling liquid tube within the inner tube, aligned with the axis of the inner tube along its whole length;
   one end of the cooling liquid tube having a plurality of holes on its side surface and the end being located within the cathode cavity;
   wherein the connection between the cathode and the inner tube provides fluid communication between the cathode cavity and the inner tube interior;
   the inner tube further comprising at least one cooling liquid removal port at the end distal from the cathode;
   and wherein the second end of the cooling liquid tube receives cooling fluid, the cooling fluid traverses the length of the cooling liquid tube, enters the cathode cavity through the holes, travels back along the inner tube and exits through the removal port.

3. The glow discharge lamp as claimed in claim 2 wherein:
   the cooling liquid tube is metal.

4. The glow discharge lamp as claimed in claim 2 wherein the cooling fluid is selected from the group consisting of air and water.

5. The glow discharge lamp as claimed in claim 1 further comprising:
   a metal heat extracting radiator in contact with and circumferentially surrounding the anode, wherein the heat extracting radiator conducts heat from the anode and releases it to the surrounding ambient atmosphere.

6. The glow discharge lamp as claimed in claim 5 wherein:
   the metal heat extracting radiator is made of copper.

7. The glow discharge lamp as claimed in claim 1 wherein:
   the outer tube is composed of optically transparent material.

8. The glow discharge lamp as claimed in claim 7 wherein:
   the inner tube is composed of optically reflective material.

9. The glow discharge lamp as claimed in claim 2 wherein:
   the cooling fluid is fluid to be treated by the UV emitted; and
   the inner tube is composed of optically transparent material.

10. The glow discharge lamp as claimed in claim 9 wherein:
    the cooling liquid tube is composed of optically transparent material.

11. The glow discharge lamp as claimed in claim 9 wherein:
    the outer tube is composed of optically reflective material.

12. The glow discharge lamp as claimed in claim 9 further comprising:
    optically reflective material disposed on the outer periphery of said outer tube.

13. The glow discharge lamp as claimed in claim 9 wherein:
    the fluid to be treated is selected from group consisting of air and water.

14. The glow discharge lamp as claimed in claim 9 wherein:
    said fluid treatment results in said fluid being disinfected.

* * * * *